(12) United States Patent
Hiraki

(10) Patent No.: US 11,522,972 B1
(45) Date of Patent: Dec. 6, 2022

(54) EMERGENCY COMMUNICATION SYSTEM AND METHOD

(71) Applicant: Central Ops, LLC, Mililani, HI (US)

(72) Inventor: Randall T. Hiraki, Mililani, HI (US)

(73) Assignee: Central Ops, LLC, Mililani, HI (US)

( * ) Notice: Subject to any disclaimer, the term of this patent is extended or adjusted under 35 U.S.C. 154(b) by 0 days.

(21) Appl. No.: 17/721,139

(22) Filed: Apr. 14, 2022

Related U.S. Application Data

(60) Provisional application No. 63/258,284, filed on Apr. 15, 2021.

(51) Int. Cl.
| | |
|---|---|
| *H04W 4/08* | (2009.01) |
| *H04L 67/55* | (2022.01) |
| *H04L 67/02* | (2022.01) |
| *H04W 4/90* | (2018.01) |
| *H04W 76/40* | (2018.01) |
| *H04L 12/18* | (2006.01) |

(52) U.S. Cl.
CPC .......... *H04L 67/55* (2022.05); *H04L 12/1895* (2013.01); *H04L 67/02* (2013.01); *H04W 4/90* (2018.02); *H04W 76/40* (2018.02)

(58) Field of Classification Search
CPC ....... H04W 4/90; H04W 76/40; H04W 76/50; H04W 4/02; H04L 12/1895; H04L 67/55; H04L 67/02
See application file for complete search history.

(56) References Cited

U.S. PATENT DOCUMENTS

| | | | | |
|---|---|---|---|---|
| 9,462,614 B2* | 10/2016 | Krizik | ................... | H04W 76/50 |
| 10,547,916 B1* | 1/2020 | Liu | ...................... | H04L 65/1056 |
| 2013/0012154 A1* | 1/2013 | Ramos | ................ | H04L 12/1895 |
| | | | | 455/404.2 |
| 2013/0185220 A1* | 7/2013 | Good | ..................... | G06Q 50/01 |
| | | | | 709/204 |
| 2019/0139383 A1* | 5/2019 | Folsom | ................ | G08B 25/014 |

\* cited by examiner

*Primary Examiner* — Chirag R Patel
(74) *Attorney, Agent, or Firm* — Patrick J. S. Inouye

(57) ABSTRACT

An emergency communication system and method are disclosed. Pre-arranged lists of specific groups of public users and contact information, a plurality of possible emergency conditions defining a push notification for an effective emergency response, and a plurality of landing web pages with group-specific displays of emergency directives tailored to one of the specific groups are stored. Each push notification includes an electronically actuatable link. A control module selects a pre-arranged list upon an occurrence of one of the possible emergency conditions, and a dispatch module dispatches the push notification corresponding to the possible emergency condition to the specific groups in the selected pre-arranged list. A secure emergency directive website serves a landing web page in response to the electronically actuatable link as triggered by the specific groups of public users and enables the public users to navigate to the group-specific displays of emergency directives tailored to those specific groups.

20 Claims, 5 Drawing Sheets

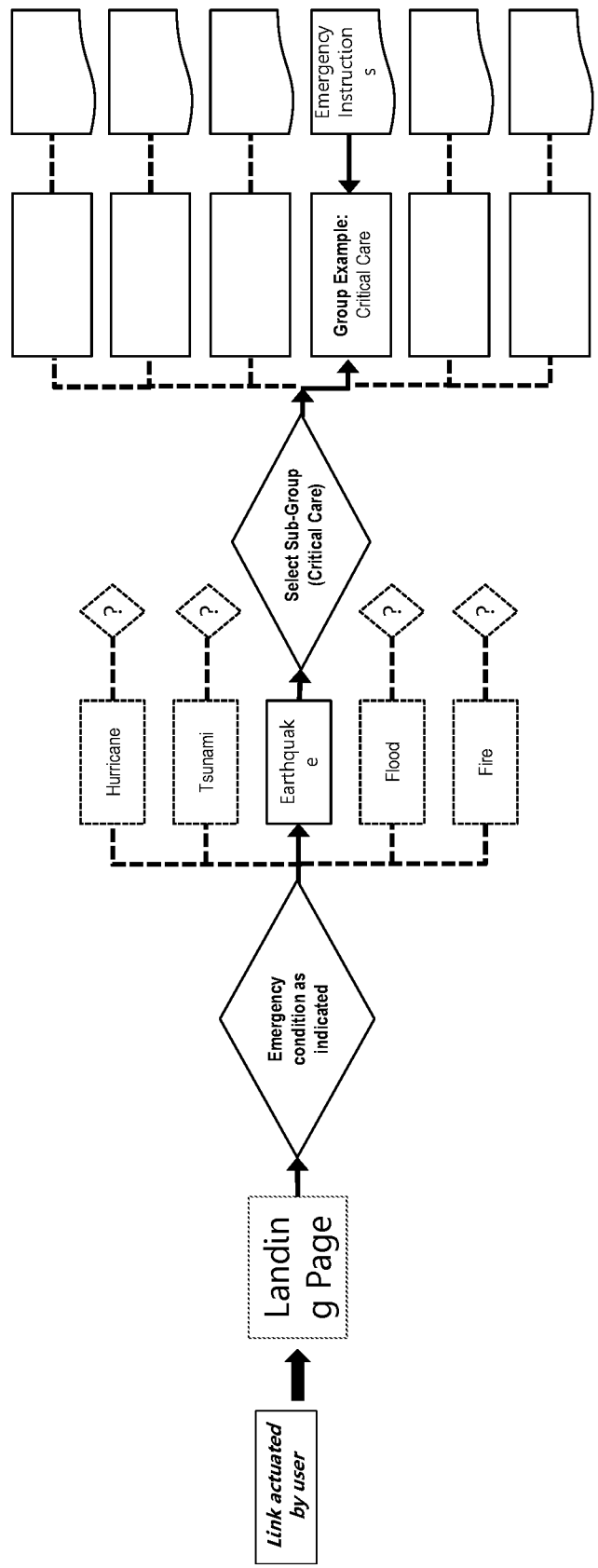

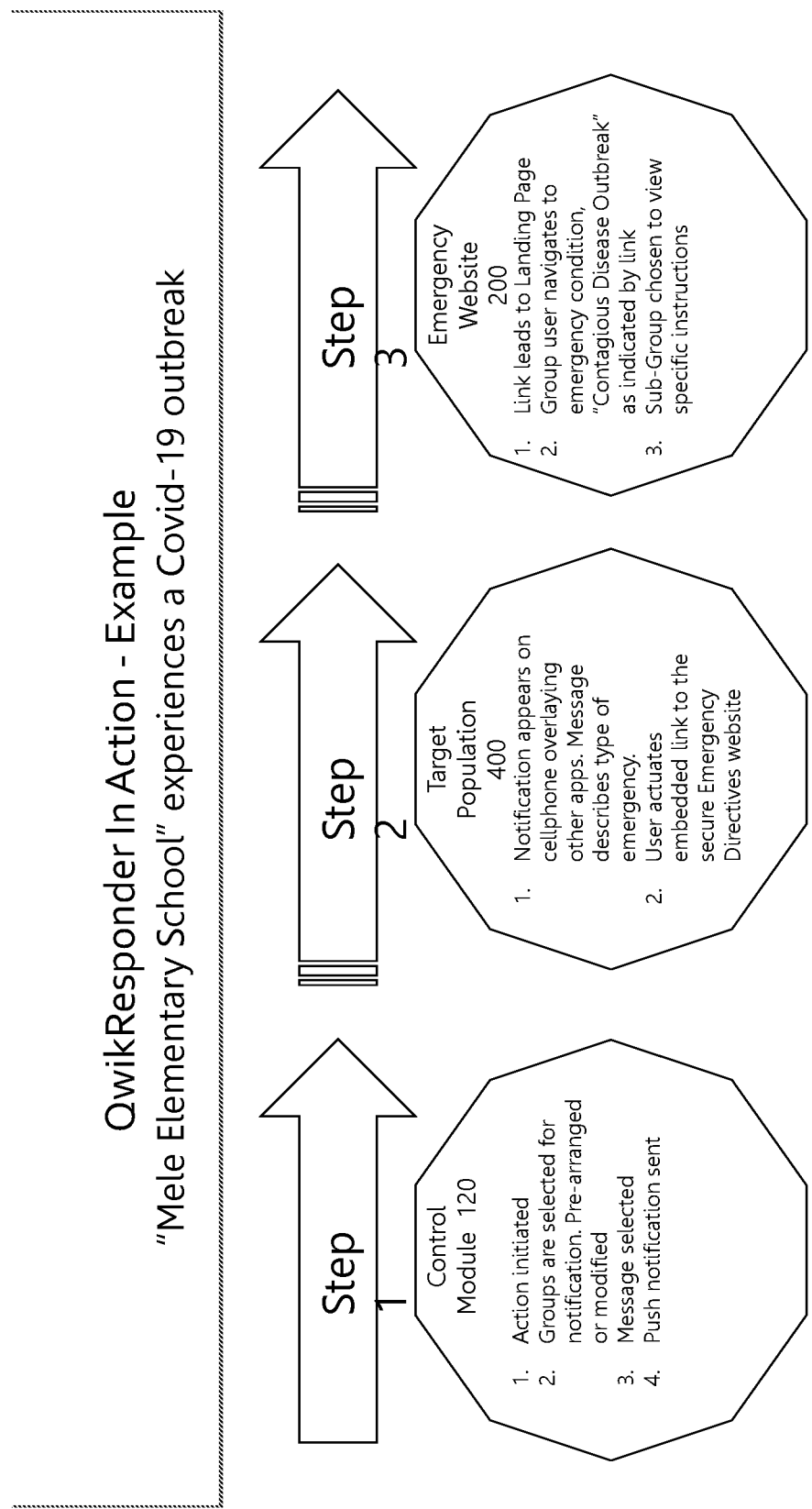

EMERGENCY COMMUNICATION SYSTEM AND METHOD

CROSS-REFERENCE TO RELATED APPLICATION

This non-provisional patent application claims priority under 35 U.S.C. § 119(e) to U.S. Provisional Patent application Ser. No. 63/258,284, filed Apr. 19, 2021, expired, the disclosure of which is incorporated by reference.

FIELD

This invention relates in general, to an emergency communication system and method and in particular, to an emergency communication system and method operable on the Internet for pushing out mass notification of an emergency condition to public users via user digital devices.

BACKGROUND

Emergency conditions that can severely impact public health, safety, security, and general well-being occur at all hours daily around the world. Governmental and crisis management agencies commonly use emergency dispatch centers to notify and alert designated responders of an emergency occurring near their location or within their jurisdiction. For example, in the United States, people can seek police help by calling the reserved telephone code "9-1-1" on their telephones to speak to an emergency dispatch operator who is trained to assess the caller-described emergency and dispatch police, emergency medical technicians (EMTs) or paramedical professionals, firefighters, or other first responders to the caller-identified location of the emergency. Often, however, these emergency dispatch operators struggle through a time-consuming process with an unknown caller to extract important and critical information from the caller as necessary to identify and perform the dispatching requirements appropriate to the emergency.

Emergency telephone dispatch centers focus primarily on alerting only those first responders assigned to emergency dispatch. These centers typically do not notify members of the public in general. As well, these centers will not ordinarily notify specific groups within the general population who may be affected by or who may have a special designated role in an emergency. Such specific groups include other emergency responders outside the center's geographical sphere of dispatch or emergency response agencies that provide a broader range of assistive services, such as temporary housing to fire-displaced individuals. Specific groups could also include personnel in proximity to the location of emergency events who may otherwise have a crucial role to perform or could be affected by the emergency in a manner that requires them to act immediately, such as the caregivers responsible for attending elderly patients in a rest home charged with getting those patients to safety in the event of an emergency nearby.

Emergency communication systems, in contrast with emergency telephone dispatch centers, work to notify the public of an emergency or critical situation of important public concern more broadly. With the proliferation of digital data and mobile (cellular) communication networks combined with the widespread adoption of mobile telephones, emergency communication systems have been developed that enable governmental and other official emergency response agencies to "push," that is, unilaterally initiate a one-way communication to base of subscriber communication devices, mass notifications to the public for a range of emergency conditions. For example, to ask the public for help in finding abducted children, many states can issue "Amber Alerts" over a wide range of communication media, including commercial and public radio stations, Internet radio, satellite radio, television stations, text messages, and cable television, in addition to automated signage along public roads.

Such push notification systems can also provide updated notifications as emergency conditions evolve.

Emergency communication systems have also begun to use cloud-based technology to address the limitations of legacy-based hardware and software, which may be too expensive to purchase, maintain, or too onerous to upgrade on a company-by-company basis. For instance, traditional client server computing models are limited by the pairing of each client to a particular server; physical limits on the computational capabilities of a server may preclude providing notification services to an increasingly larger client population and at some point, the abilities of the server to serve additional clients becomes impracticable to unachievable.

Fortunately, by virtualizing physical computing platforms, cloud-based technology can offer generally fast and less expensive solutions for handling push notifications to the public using email, texting, and other digital data communication channels. Such systems can provide push notifications to a generalized group of users using only stored lists of email addresses, telephone numbers or other forms of contact information because a cloud-based approach abstracts the physical hardware to accommodate a virtually unlimited number of clients. Moreover, several kinds of cloud technology platforms can be combined to obtain a faster or broader reach to targeted public users.

One limitation of current emergency communication systems is in not providing follow-up emergency directives tailored to specific groups of users in their push notifications. As a result, users who have received an initial push notification of an emergency are often left to decide for themselves what to do next. For example, a push notification of a building fire will trigger a general evacuation of all the occupants of the building; however, where a building occupant is unable to evacuate, such a wheelchair-bound individual who cannot descend a stairwell, a specific group of responders ought to be tasked to assist that individual in evacuating the building. Current emergency communication systems are ill-equipped, if at all, to address this kind of follow-up situation, whether occurring on-site or remote.

Another limitation of current emergency communication systems is where a push notification of an emergency condition does not differentiate among groups of users who may need specific directives to perform different things. A specific group of users may need directives that differ depending on what type of emergency condition is occurring or what type of emergency response may be needed. For example, a governmental agency that has primary jurisdiction over one type of emergency, such as FEMA for emergency response to coastal storms, may not have the trained staff and developed plans to direct users in another field of public concern, such as how to access to CDC directives for COVID vaccinations in an area hit by storm-flooding using FEMA's capabilities for push notification.

Therefore, a need remains for providing the capabilities to emergency communication systems to provide push notifications to targeted group or groups of users seeking access to group-specific emergency directives.

SUMMARY

An emergency communication system and method sends push notification to a group or groups of users for linking to a web display of group-specific emergency directives for emergency response to an emergency condition.

One embodiment provides an emergency communication system. A digital data communications network is provided. A storage device includes a database including persistently stored pre-arranged lists of specific groups of public users and contact information for each such public user, a persistently stored plurality of possible emergency conditions, each such possible emergency condition defining a push notification operative to mobilize an effective emergency response, and a plurality of landing web pages. Each landing web page includes group-specific displays of emergency directives tailored to one of the specific groups. Each push notification includes an electronically actuatable link to one such landing web page. A secure server includes a processor operatively coupled to a memory within which is maintained program instructions configured to be executed by the processor and a network adapter communicatively interfaced to the digital data communications network. The program instructions include a control module configured to select one such pre-arranged list of specific groups of public users upon an occurrence of one of the plurality of possible emergency conditions, and a dispatch module configured to dispatch the push notification corresponding to the one such possible emergency condition to the specific groups of public users in the selected pre-arranged list. A secure emergency directive website is communicatively operable over the digital data communications network configured to serve one or more such landing web page in response to the electronically actuatable link as triggered over digital data communications network by the specific groups of public users in the selected pre-arranged list and to enable the public users in the specific groups to navigate to the group-specific displays of emergency directives tailored to those specific groups.

A further embodiment provides a method for providing emergency communication. Pre-arranged lists of specific groups of public users and contact information for each such public user and a plurality of possible emergency conditions are persistently stored. Each such possible emergency condition defines a push notification operative to mobilize an effective emergency response. A plurality of landing web pages is stored. Each landing web page includes group-specific displays of emergency directives tailored to one of the specific groups. Each push notification includes an electronically actuatable link to one such landing web page. Using a secure server communicatively interfaced to a digital data communications network, one such pre-arranged list of specific groups of public users is selected upon an occurrence of one of the plurality of possible emergency conditions and the push notification corresponding to the one such possible emergency condition is dispatched to the specific groups of public users in the selected pre-arranged list. Through a secure emergency directive website, one or more such landing web page is served in response to the electronically actuatable link as triggered over the digital data communications network by the specific groups of public users in the selected pre-arranged list and the public users in the specific groups are enabled to navigate to the group-specific displays of emergency directives tailored to those specific groups.

A still further embodiment provides a system. A non-transitory computer-readable storage medium that stores computer instructions that, when executed by a processor on computer device, cause the processor to persistently store pre-arranged lists of specific groups of public users and contact information for each such public user and a plurality of possible emergency conditions, each such possible emergency condition defining a push notification operative to mobilize an effective emergency response; storing a plurality of landing web pages, each landing web page including group-specific displays of emergency directives tailored to one of the specific groups, each push notification including an electronically actuatable link to one such landing web page; select using a secure server communicatively interfaced to a digital data communications network one such pre-arranged list of specific groups of public users upon an occurrence of one of the plurality of possible emergency conditions and dispatch the push notification corresponding to the one such possible emergency condition to the specific groups of public users in the selected pre-arranged list; and serve through a secure emergency directive website one or more such landing web page in response to the electronically actuatable link as triggered over the digital data communications network by the specific groups of public users in the selected pre-arranged list and enable the public users in the specific groups to navigate to the group-specific displays of emergency directives tailored to those specific groups.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIG. 2 is a block diagram showing, by way of example, the Secure Emergency Directives Website for receiving links from push notification of users on a landing web page and enabling them to navigate to group-specific displays of emergency directives tailored to the selected group or groups of users.

FIG. 3 is a block diagram showing, by way of example, a sequence of actions for an example of using the Emergency Communication system for push notification in a pandemic outbreak emergency at a school in accordance with a further embodiment.

DETAILED DESCRIPTION

Figure 1A:
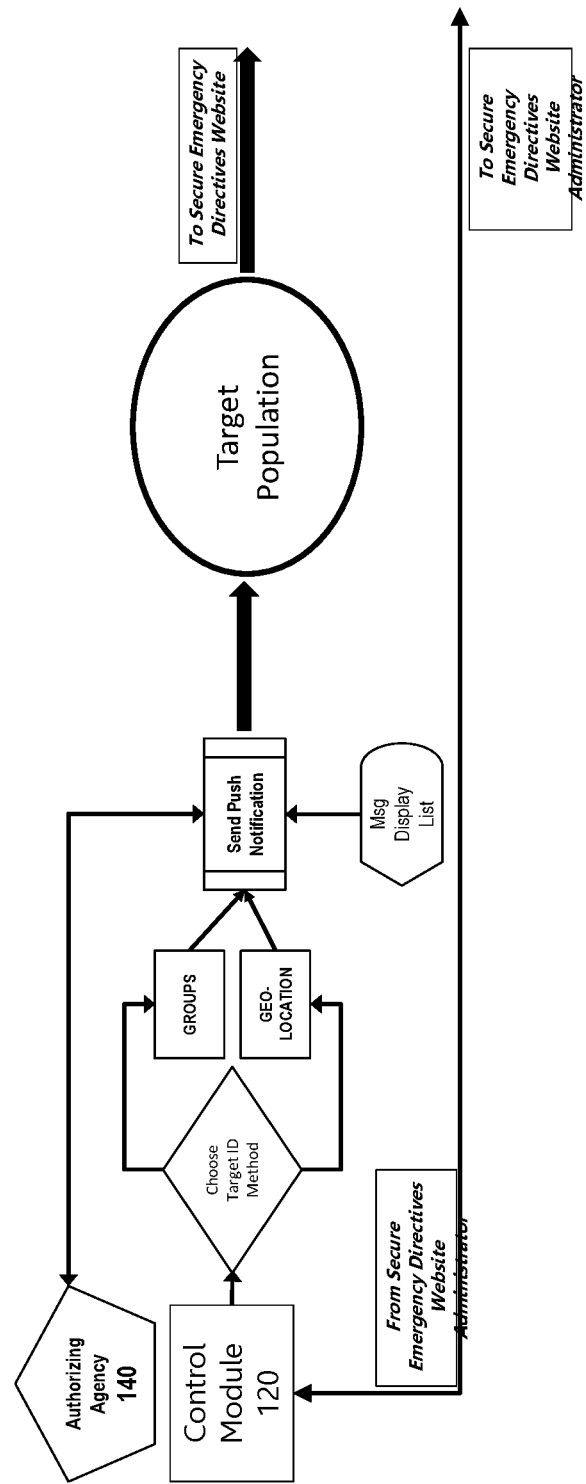
FIG. 1A is a block diagram showing, by way of example, the Control Module portion of an Emergency Communication system for providing one or more groups of users with push notification of an emergency condition in accordance with one embodiment.

The following is a description of preferred examples of implementation of the invention herein applied for patenting. The description may refer to certain computerized methods, procedures, components, or functions commonly known to persons familiar with computerized technology, and accordingly are not described in unneeded detail so as not to obscure the description herein.

The specific implementation examples are described in detail herein for purposes of enabling those familiar with this field to understand these preferred examples of how the invention may be practiced. However, the described invention system or method may be practiced in other or related ways, using equivalent functional embodiments, or by adapting it to analogous application environments.

The description herein may refer to well-known computer hardware systems or components thereof, or to computer software or modules, functions, procedures, steps, or logic units thereof.

Definitions

The following terms may be understood to non-exclusively carry the following meanings, although other meanings and interpretations thereof are possible:

The term "Internet" may be used herein to refer to an interconnected structure of networks connecting users worldwide using a standard numerical network node addressing (TCP/IP) protocol. The websites interconnected on the Internet may be registered under unique entity text names and domain names addressable by standard text name addressing (http://) protocol. The interconnected, name-addressable websites are commonly said to be "online" and are referred to collectively as the "World Wide Web" (www). Users having a connection to the Internet commonly use browsers on their computers or client devices to connect to and display visual information contained on servers used to host and maintain such addressable websites for access by users.

Users on the World Wide Web engage in billions of transactions of daily commerce with online merchants and vendors through their websites. Such commercial transactions that occur over the World Wide Web or use standard interconnection protocols that leverage the Internet are collectively known as "electronic commerce" or "e-commerce." Communication in text, voice, video, data files by attachment, and other formats may be sent between users by email.

The Internet may also be connected to cellphone networks enabling online websites to send text messaging, or texting, to the telephones of users via Short Message Service (SMS) protocol or enhanced multimedia messages using Multimedia Messaging Service (MMS) protocol. Texting does not require the caller and recipient to be on-the-call at the same time. Text messaging can also be used to interact with automated systems, for example, to order products or services from e-commerce websites, or to participate in online contests. Advertisers and service providers may use direct text marketing to send messages to mobile users about promotions, payment due dates, and other notifications instead of using postal mail, email, or voicemail.

The Internet may be connected to other types of networks using different data handling protocols through network gateways or adapter interfaces. Wireless data gateways using the industry-standard Wireless Application Protocol (WAP) can connect Internet websites to wireless data networks for users operating wireless data devices such as smartphones.

The term "cloud computing" or "cloud storage" may be used herein to refer to industry standard protocols for enlisting dispersed computer system resources, especially data storage and computer processing power, without the need for direct active management by a host or enlistee. Physical computational hardware is virtualized and servers are treated as an abstraction, rather than a physical hardware suite. Thus, cloud computing can cleanly scale upwards (or downwards) to accommodate an increasingly larger (or smaller) client base, as service needs evolve. As a metaphor, the entire provider-managed suite of hardware and software resources can be thought of as an amorphous "cloud" through which can be provided virtually limitless computational capabilities and storage capacity. Large clouds may have functions distributed over multiple locations from a provider's central servers. A cloud may be limited to a single organization (enterprise cloud), or be available to multiple organizations (public cloud).

The invention system and method are described herein and illustrated in the accompanying drawings as comprising various blocks, components, circuits, steps, operations, processes, algorithms, and the like, which may be referred to as "elements" for simplicity. These elements may be implemented using computer hardware, software, or any combination thereof.

The term "processor" may be used herein to refer to any suitable type of processing element among various types of microprocessors, microcontrollers, Central Processing Units (CPUs), digital signal processors (DSPs), field programmable gate arrays (FPGAs), programmable logic devices (PLDs), Application-specific Integrated Circuits (ASICs), state machines, gated logic, discrete hardware circuits, and other suitable hardware or combinations configured to perform various functions described herein.

One or more processors in a processing system may execute lines of computer coded instructions in software, firmware, or middleware (collectively referred to as "software"). Moreover, the term "software" shall be construed broadly to mean any instructions, instruction sets, code, code segments, program code, programs, subprograms, software components, applications, software applications, software packages, routines, subroutines, objects, executables, threads of execution, procedures, functions, and the like. As well, non-transitory computer-readable storage mediums may store computer instructions that, when executed by a processor, on a processing system, cause the processor to perform a sequence or series of programmatic instructions or steps.

The term "server" may be used herein to refer to any computer hardware or software that provides functionality for other programs or devices, called "clients." Servers can provide various functionalities, often called "services," such as sharing data or resources among multiple clients, or performing computation for a client. A client process may run on the same server platform or may connect over a network, typically the Internet, to a server on a different server platform. Typical servers are database servers, file servers, mail servers, print servers, web servers, game servers, and application servers.

The term "user" may be used herein to refer to an individual person who operates a user device for computing, displaying, communication and other capabilities.

The term "landing page" or "landing webpage" may be used herein to refer to a single web page that appears in response to clicking on a link embedded in email, text message, search listing, webpage text, online advertisement, etc. The landing page will usually display directed content that is a logical extension of the context in which the link appears. A landing page may be part of a microsite or a single page within an organization's main web site.

The term "user device" may be used herein to refer to any portable electronic device with a display and electronic communication capability. Some examples of a user device include, but are not limited to, a mobile device, cellular telephone, mobile telephone, smart telephone, tablet computer, laptop computer, desktop computer, notebook computer, smart watch, personal digital assistant, music player, multimedia player, portable computing device, navigation system, in-vehicle computer, television (TV) device, smart TV, set-top box, cable modem, and so forth.

The term "first responder" or "responder" in general may be used herein to refer to an individual trained, certified, contracted for, or employed to respond to an emergency and help users involved in the emergency. Some examples of responders include police officers, deputy sheriffs, paramedics, firefighters, ambulance workers, rescuers, private security agents, government agents, army, navy, emergency volunteers, and any other government or private agents or officers who help or assist persons in an emergency.

The term "emergency" may be used herein to refer to any situation that poses an immediate, significant, urgent, or otherwise pressing risk to health, life, property, security, environment, or general well-being. Emergencies may be natural, including, for example, hurricane, tsunami, earthquake, flood, fire, and the like, or may be man-made, including, for example, an accident, severe health condition, criminal act against a person, war, and the like.

The term "emergency communication system" may be used herein to refer to an electronic system for sending or receiving an electronic message, notification, or alert about an emergency to public users on user devices. An emergency communication system can include the processing or handling of other types of data, such as the geographical location of a user or user device, different types of emergencies, and other types of user information, including personal data, photographs, video, voice, audio, text, and so on.

Push Notification Linked to Group-Specific Display of Emergency Directives

FIG. 1A is a block diagram showing, by way of example, the Control Module portion of an Emergency Communication system for providing one or more groups of users with push notification of an emergency condition in accordance with one embodiment. The Emergency Communication system (or "ECS" as acronym) has a Communication Management Portion 100 that includes a Control Module 120. The Communication Management Portion 100 is operable on a secure server or through a cloud-based implementation (not shown). The Emergency Communication system is connected to the Internet or other form of digital data communications network via a network adapter interface for dispatching push notification to public users or specific groups of the public users on to their user digital devices, such as mobile telephones. The Control Module 120 is connected to a storage device, either directly or through the Internet or other digital data communications network, and the storage device persistently stores a database of user information, including contact information, plus identifies specific groups of users and their needs. Both the Control Module 120 and the database may be implemented through a cloud-based platform.

The Control Module 120 functions by setting up in advance a range of types of emergency conditions that may require push notification, and identifying in advance one or more groups of users, which may be selected for the Target Population 400 for push notification. Specific groups of users may be identified. Similarly, differentiations among groups of users who may need specific directives to perform different things may be identified. Each identified group of users is assigned a link to a Landing Web Page of a Secure Emergency Website that operates over the digital data communications network for displaying follow-up emergency directives tailored to the selected group or groups of users. The follow-up emergency directives are served by the Secure Emergency Website in response to the electronically actuatable link being triggered over Internet or digital data communications network.

The operation of the Control Module 120 can be configured in at least three operational modes. In a first mode for use by an individual company or agency (collectively "entity"), the Emergency Communication system is operable on a server location of the individual company or agency. The Control Module 120 is connected for communication with an Administrator Module providing supervisory control and operating upon which the Secure Emergency Directives Website (described further below with reference to FIG. 2) is deployed.

In a second mode, the Control Module 120 is operable to select a list with multiple groups of users who are to receive multiple push notifications, via a dispatch module, each respectively including a link to a landing web page of the Secure Emergency Directives Website different from the others. As such, FIG. 1C is a block diagram showing, by way of example, the Control Module operable to select multiple groups of users, through a selection module, to receive multiple push notifications each respectively including a link to a landing web page of the Secure Emergency Directives Website different from the others.

Referring back to FIG. 1A, a third mode for use by a "Higher Agency" with authority or jurisdiction over other companies or agencies as groups of users is described in which the Control Module is subject to input from the Higher Agency HQ 140 for approval to send a push notification. The "Higher Agency" can condition the dispatch of push notifications on approval input from that higher agency. This mode acts as a security measure preventing agency personnel from a lower company or agency from sending an unauthorized push notification to the public by mistake, inadvertence, sabotage, or other form of unauthorized notification. When a push notification for an emergency condition is confirmed by Higher HQ 140, the Send Msg module 150 generates a push notification message addressed to user device addresses (phone numbers in this example) listed by the Msg Display List 160 and sends out the Push Notification message 300 to the Target Population 400 about the emergency condition.

The Control Module can select between Groups 130 of public users or a Geo-Location Group 131 of users based upon their home addresses falling within a certain radius, by geolocation of their telephones in proximity to the location of an emergency condition, or other association of those users with the geolocation. Push notifications may be sent from both Groups 130 and Geo-Location Group 131 in successive pushes, or, as shown with reference to FIG. 1C, performed together in multi-push mode.

The primary function of the ECS application is to identify the telephone owner as a potential receiver of emergency notifications. If a provider application is used, the users who have downloaded the ECS application can receive the ECS push notifications on their mobile telephones. The construction is not complex and may be implemented, for example, by coding for GPS capabilities through Google services. Email, text messaging, and voice calls are not typically used because they are too slow when an emergency makes mass communication speed essential.

Figure 1B:
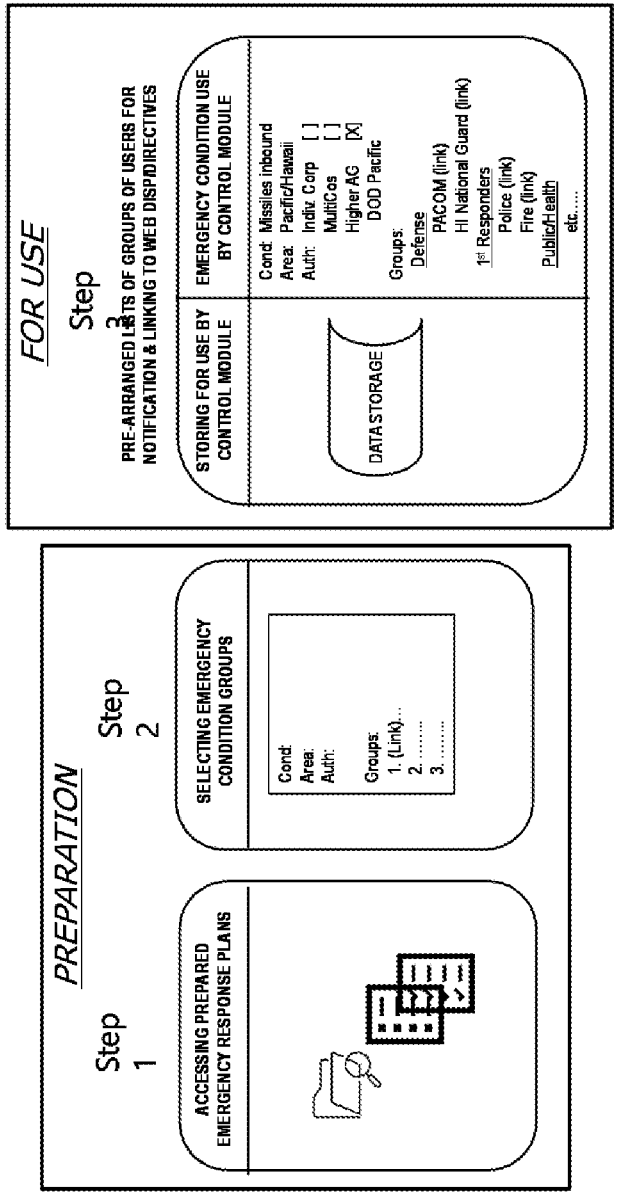
FIG. 1B is a block diagram showing, by way of example, the Control Module operable to set up pre-arranged lists of group/groups of users based upon prepared emergency response plans for given emergency conditions.
Figure 1C:
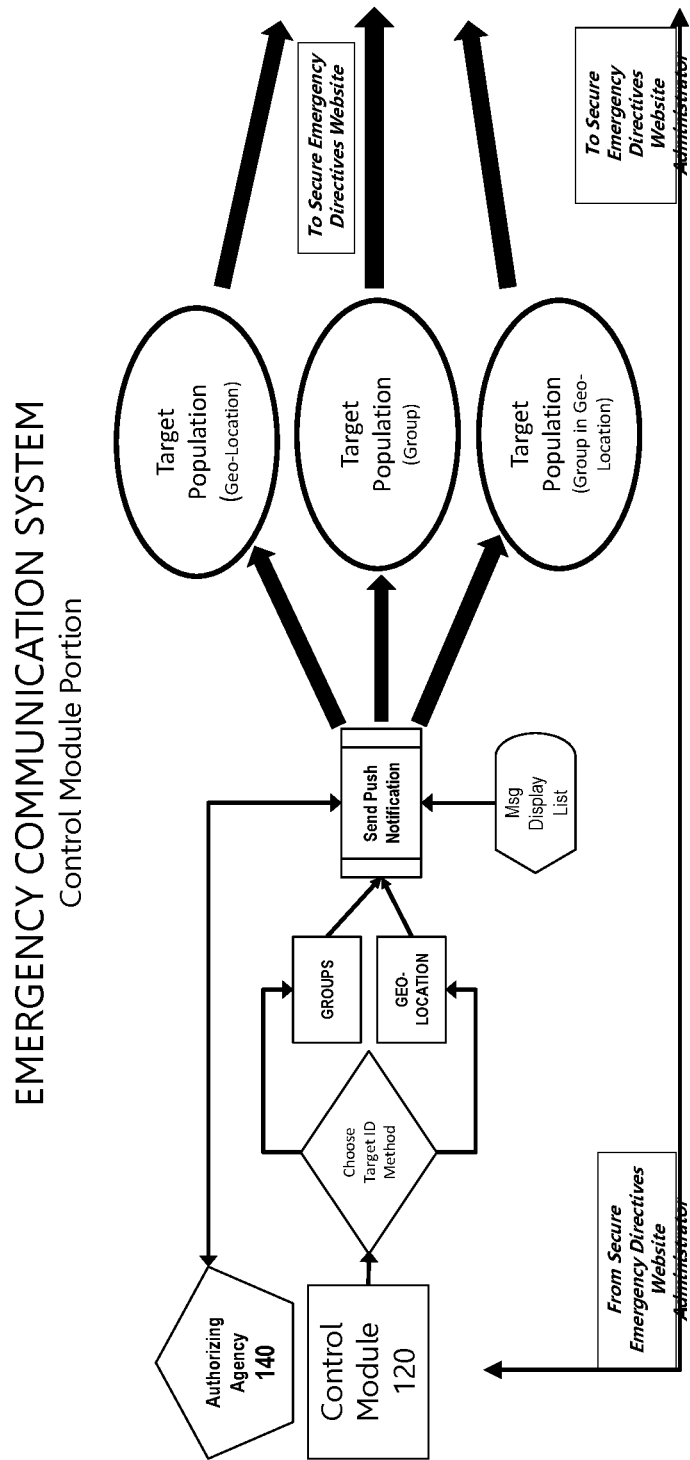
FIG. 1C is a block diagram showing, by way of example, the Control Module operable to select multiple groups of users to receive multiple push notifications each respectively including a link to a landing web page of the Secure Emergency Directives Website different from the others.

Control Module Use of Pre-Arranged Lists of Groups of Users For Push Notification FIG. 1B is a block diagram showing, by way of example, the Control Module operable to set up pre-arranged lists of group/groups of users based upon prepared emergency response plans for given emergency conditions. In Step 1, an operator of the Control Module 120 accesses prepared emergency response plans for each respective emergency condition. The prepared emergency response plans would incorporate the longtime training and experience of the most knowledgeable emergency response administrator(s) for selection of specific groups to be notified in the respective types of emergency conditions. In Step 2, the operator of the Control Module 120 selects the specific group/groups of users best suited to mobilize an effective emergency response to be listed on the pre-arranged list. The link for the target landing web page is also identified for each group. In Step 3, the operator stores the pre-arranged lists of selected group/groups of users and links for use by the Control Module 120 upon occurrence of a particular type of emergency condition. In this manner, the pre-arranged lists of selected group/groups of users would incorporate the best training, experience, and knowledge for emergency response and be usable instantaneously by the Control Module 120 upon occurrence of an emergency condition.

Secure Emergency Directives Website: Display of Group-Specific Emergency Directives FIG. 2 is a block diagram showing, by way of example, the Secure Emergency Directives Website for receiving links from push notification of users on a landing web page and enabling them to navigate to group-specific displays of emergency directives tailored to the selected group or groups of users. A second part of the Emergency Communication system is made up of a Secure Emergency Directives Website 200 for receiving links actuated by users from push notification to a Landing Web Page 220. The Landing Web Page 220 channels the landing user based on the emergency condition type, as indicated by the weblink. In the example described, the emergency types offered are Hurricane tab 230a, Tsunami tab 230b, Earthquake tab 230c, Flood tab 230d, or Fire tab 230e. In this example, the emergency condition indicated is Earthquake tab 230c. The user groups indicated by the landing link are captured by the corresponding Group Selector 240c and results in the groups being directed to displays of Emergency Instructions for their respective Geriatrics Group 250x and Critical Care Group 250y.

The Secure Emergency Directives Website is managed by an Administrator 600 through an administrator module and includes a communication loop 700 to the Control Module 120. This combined system allows the delivery of targeted text messages as pre-arranged in display plans maintained by the Administrator 600. Each instance of the software for setting up and maintaining the website through the Internet can service one organization. The name of the software and branding should be able to be changed by users. Still other modifications and additions to function and modality are possible.

Administrator Functions for Secure Emergency Directives Website

The Administrator can log onto a server-side application running on the Internet and has the capability to perform the following functions:

1) Have a control panel for controlling all aspects of the system.

2) Establish and maintain a user base of individuals or groups to whom targeted messages can be sent. The number of possible groups should be unlimited.

3) Have a method to define, store and change physical zones ("geo-fences"), which can then be used to target messaging. The number of zones can be unlimited.

4) Have the ability to view all historical transactions by the Administrator and all subsequent actions by the identified people and zones under its control. The system should maintain a rolling log of at least two years of historical activity.

5) Have the ability to create, categorize, store, and update pre-defined messages using What-You-See-Is-What-You-Get ("WYSIWYG") protocol. The number of messages should be unlimited.

6) Have the ability to create spontaneous messages as needed. Also have the category of pre-defined messages linked to the emergency being called up. Can call up all messages in a category sequenced list.

7) Have the ability to send messages to people or groups within targeted locations. There should be no limitations on the number of messages able to be sent concurrently or sequentially.

8) Have the ability to schedule messages which are to be automatically sent in the future.

9) Have the ability to access a list of error messages used by the system with probable steps for resolution.

10) Have the ability to update the branding of the messages and appearance of the software to the users using WYSIWYG protocol.

11) Have the ability to access and update system documentation using WYSIWYG protocol.

12) All log information, error message documentation, and system documentation should be able to be copied and pasted into Microsoft Word, Excel or Access on a workstation.

13) All log information, error message documentation and system documentation should be able to be keyword searched and sorted by the Administrator.

14) Have the ability to review, approve or reject potential user access to the system.

Other functions performable by the administrator are possible.

Users are the individual persons with their user devices who receive push notification messages sent by the Administrator. They typically would have an instance of the ECS app loaded on their smartphone at boot up, initiated, and set up to run in the background.

The ECS app has the capability to perform the following:

1) Have the ability to receive targeted messages and respond using texting, email or telephone.

2) Have the ability to receive branded messages sent by the Administrator.

3) Document historical activity for at least one rolling month.

4) Have available to the user a limited list of error messages used in the app, including probable steps for resolution.

5) Have available to the user a limited set of system documentation applicable to the app on the smartphone.

6) Have the ability to automatically link to the management software, giving the Administrator the ability to accept or reject the user.

Other functions performable by the ESC app are possible.

The ECS System has a higher level of management security hidden from the Administrator, which can only manage forced password resets for the Administrator. This level is to be used as a fail-safe if an Administrator forgets the password or that the Administrator is deemed unauthorized to access the system.

The smartphone can provide perimeter security with the ability to self-correct by the user in the event of a problem. This function should be performed using an external email address.

Multi-level Authentication, that is, management of users who have access to certain features of the system, may be implemented as follows:

Users listed to use the ECS System are managed by the Administrator. The Administrator ensures that the smartphone code is downloaded onto user devices so that the code exists in background mode with a normal device boot up. This step ensures that the management software is linked to all authorized users using an automated procedure. Externally, training is provided to new users and for facilitating their normal user device operation.

The Control Module 120 sends out both normal communication and emergency messages via push notifications, currently, a commonly-used method in digital data commerce marketing. The digital package sent as a push notification contains an image to identify the sender, a message, and, in the case of an emergency message, a link to the agency's or company's secure emergency website. The use of the weblink gives the notification recipient immediate access to specific instructions depending on the type of emergency. This procedure directly addresses the dilemma usually posed after receipt of the notification, that is, "Now, what am I supposed to do?" That question is answered with the use of the weblink in the notification taking the recipient to the displays specific to the selected group on the emergency directives website.

The use of an emergency directives website takes the emergency notification industry to a new level by providing follow-up emergency directives tailored to specific groups of users in their push notifications and by enabling the sending of a push notification of an emergency condition that can differentiate among groups of users who may need specific directives to perform different things. Thus, small companies with a limited staff could conceivably send notifications and thereafter actively provide follow up notifications with specific instructions, in contrast to large companies unable to accommodate specific follow up notifications due to the time limitations associated with emergencies.

The ECS System can make this procedure work because of one critical factor, the ability to create and maintain thousands of employee specific emergency plans that are deconstructed from a master company plan. Instead of having a voluminous company document metaphorically sitting on someone's bookshelf, the ECS System can separate out instructions for individual employees or classes of employees and assist the client in placing the deconstructed plans into an appropriately structured website. This process allows a large company to have an informed and efficient staff during a crisis.

The use of a secured emergency website enables a company to make changes to its management and recovery plans quickly without incurring heavy costs. Instead of making changes to the software, changing the website is considerably more efficient and less costly.

Example: COVID-19 Outbreak in School

FIG. 3 is a block diagram showing, by way of example, a sequence of actions for an example of using the Emergency Communication system for push notification in a pandemic outbreak emergency at a school in accordance with a further embodiment. The scenario illustrates the Emergency Communication system, QwikResponder, working in a fictional elementary school, "Mele Elementary School," that is experiencing a COVID-19 outbreak.

Step 1, Control Module 120

A. The Principal of Mele Elementary School recognizes the emergency and initiates an alert.

B. The operator of the Control Module 120 selects the appropriate emergency event, in this example, "Infectious Disease Outbreak." The selection of the emergency event calls up a pre-arranged checklist for the Control Module's operator to reference.

C. The operator of the Control Module 120 checks the pre-arranged listing of groups for that emergency condition, and manually makes any desired changes thereto, to select the groups of users to receive the push notification. Another option is to select the Geolocation Group of users whose geolocations (as indicated by an ECS subscriber app downloaded by the user or by access to smartphone GPS data) are in proximity to the expected impact area of the emergency condition. Using the pre-arranged listings enables multiple groups to be quickly selected and designated to receive the push notification message and embedded weblink.

D. The message is selected from a pre-determined list associated with the emergency event, spontaneously composed, or a combination of both.

E. The paush notification is sent.

Step 2, Target Population 400

A. The push notification is received by a Target Population 400. The push notification appears on the electronic device whether the device is in use or on standby. An image of the company's logo, slogan, or other brand recognition ("branding") provides instant recognition and credibility while the message identifies the emergency condition. The embedded weblink allows access to the secure emergency website and pre-determined, individualized instructions.

B. The embedded weblink is activated. The action of activating the weblink will send a signal back to the Control Module and result in a green light lighting up on the control panel next to the person's name. This feedback loop allows the Control Module operator to know which individuals are actively responding to the push notification.

Step 3, Emergency Directives Website 200

A. A push notification recipient arrives at the secure Emergency Website 200 landing page.

B. From the list of emergency events, the "Infectious Disease Outbreak" is selected for this scenario.

C. The second level choice depends on the person's group, for instance, Staff, Parent or Guardian, Police, Fire Department, and so on, and leads to specific instructions.

As an ancillary feature, the ECS system may use WYSIWYG formatting of push notification messages with a company or agency's logo or brand as a security measure. The Control Module 120 may generate push notification messages in WYSIWYG display format tailored to the one or more groups of users set-up in advance for push notification. For push notification to users associated with a specific agency, the WYSIWYG-formatted push notification message may include a logo or brand phrase of the agency for instant recognition and credibility. The Emergency Directives Portion uses pre-arranged emergency directives display plans to generate displays in WYSIWYG format tailored to the one or more groups of users that actuate links in push notifications linking to the Landing Web Page 220. For directives display to a group of users associated with a specific agency, the WYSIWYG-formatted displays may include a logo or brand phrase of the agency for instant recognition and credibility.

As the ECS system evolves, the Control Module functions may be enhanced using an Artificial Intelligence (AI) system to perform real-time, or after-the-fact, analysis of users to be notified by push notification and linked to group- and even person-specific directives displays. Here, AI refers to machine learning algorithms and heuristics that can observe data patterns and control flow paths, either through directed ("guided") learning or undirected unguided learning methodologies. Based on the observations made, optionally combined with expert system knowledge and other sources of programmatic control, such as through analogizing problem-solution approaches from other learning domains, the AI formulates additional or alternate notifications or identifies other specific groups or group differentiations. Other forms of AI and heuristically problem-solving methodologies could be applied.

In general terms, the AI system changes the Control Module from operator-controlled to AI-controlled or AI-assisted, along with integration of Control Module functions with a central database operating with AI software. The Administrator can initiate an emergency sequence with the AI software, which will result in appropriate notifications being sent to targeted populations. Notified users can query the user app for personalized instructions, base of emergency procedures, geophysical data, locational variables, available support services, and so on. The system is flexible and adjustable to changing emergency conditions and the user's physical capacity. Through real life experiences and evaluations of scheduled exercises, the AI system can continually evolve and expand its capabilities.

While the invention has been particularly shown and described as referenced to the embodiments thereof, those skilled in the art will understand that the foregoing and other changes in form and detail may be made therein without departing from the spirit and scope of the invention.

What is claimed is:
1. An emergency communication system, comprising:
a digital data communications network;
a storage device comprising:
   a database comprising persistently stored pre-arranged lists of specific groups of public users and contact information for each such public user;
   a persistently stored plurality of possible emergency conditions, each such possible emergency condition defining a push notification operative to mobilize an effective emergency response; and
   a plurality of landing web pages, each landing web page comprising group-specific displays of emergency directives tailored to one of the specific groups, each push notification comprising an electronically actuatable link to one such landing web page; and a secure server comprising a processor operatively coupled to a memory within which is maintained program instructions configured to be executed by the processor and a network adapter communicatively interfaced to the digital data communications network, the program instructions comprising:
   a control module configured to select one such pre-arranged list of specific groups of public users upon an occurrence of one of the plurality of possible emergency conditions; and
   a dispatch module configured to dispatch the push notification corresponding to the one such possible emergency condition to the specific groups of public users in the selected pre-arranged list; and
a secure emergency directive website communicatively operable over the digital data communications network configured to serve one or more such landing web page in response to the electronically actuatable link as triggered over digital data communications network by the specific groups of public users in the selected pre-arranged list and to enable the public users in the specific groups to navigate to the group-specific displays of emergency directives tailored to those specific groups.

2. An emergency communication system in accordance with claim 1, further comprising:
   the storage device further comprising a persistently stored set of prepared emergency response plans for each such possible emergency condition; and
   the control module further configured to set up the pre-arranged lists of the specific groups of public users by grouping the public users required to mobilize an effective emergency response to each such possible emergency condition for each of the emergency response plans and storing the grouping into the pre-arranged lists in the database comprised in the storage device.

3. An emergency communication system in accordance with claim 1, further comprising:
   the storage device further comprising a persistently stored set of prepared emergency response plans for each such possible emergency condition; and
   the secure emergency directive website is configured to enable the public users in the specific groups to navigate to group-specific displays of the prepared emergency response plans corresponding to the one such possible emergency condition.

4. An emergency communication system in accordance with claim 1, further comprising:
   an administrator module configured to provide supervisory control on a server location of an entity upon which the secure emergency directive website is deployed and to communicate with the control module comprised on the secure server.

5. An emergency communication system in accordance with claim 1, further comprising:
   the control module configured to, for each such entity comprised in a plurality of entities, select one such pre-arranged list for one such possible emergency condition and dispatch the push notifications to the specific groups of public users in each such pre-arranged list.

6. An emergency communication system in accordance with claim 1, further comprising: the control module configured to, for a higher entity with authority over other such entities, condition the dispatch of the push notification on approval input from the higher entity.

7. An emergency communication system in accordance with claim 1, further comprising:
the control module configured to generate push notification messages comprising branding of an entity in WYSIWYG display format.

8. An emergency communication system in accordance with claim 1, further comprising:
the control module configured to select from a list of geolocation areas where the possible emergency conditions can occur and to list a group of the public users with contact information associated with the selected geolocation area for receiving the push notification.

9. An emergency communication system in accordance with claim 1, further comprising:
the storage device further comprising a persistently stored set of prepared emergency response plans for each such possible emergency condition; and
an artificial intelligence system configured to set up the pre-arranged lists of the specific groups of public users based upon real-time analysis by grouping the public users required to mobilize an effective emergency response to each such possible emergency condition for each of the emergency response plans and storing the grouping into the pre-arranged lists in the database comprised in the storage device.

10. An emergency communication system in accordance with claim 1, wherein the real-time analysis comprises machine learning algorithms and heuristics that can observe data patterns and control flow paths using at least one of directed learning and unguided learning .

11. A method for providing emergency communication, comprising the steps of: persistently storing pre-arranged lists of specific groups of public users and contact information for each such public user and a plurality of possible emergency conditions, each such possible emergency condition defining a push notification operative to mobilize an effective emergency response;
storing a plurality of landing web pages, each landing web page comprising group-specific displays of emergency directives tailored to one of the specific groups, each push notification comprising an electronically actuatable link to one such landing web page;
selecting using a secure server communicatively interfaced to a digital data communications network one such pre-arranged list of specific groups of public users upon an occurrence of one of the plurality of possible emergency conditions and dispatching the push notification corresponding to the one such possible emergency condition to the specific groups of public users in the selected pre-arranged list; and
serving through a secure emergency directive web site one or more such landing web page in response to the electronically actuatable link as triggered over the digital data communications network by the specific groups of public users in the selected pre-arranged list and enabling the public users in the specific groups to navigate to the group-specific displays of emergency directives tailored to those specific groups.

12. A method in accordance with claim 11, further comprising the steps of:
persistently storing a set of prepared emergency response plans for each such possible emergency condition; and
setting up the pre-arranged lists of the specific groups of public users by grouping the public users required to mobilize an effective emergency response to each such possible emergency condition for each of the emergency response plans and storing the grouping into the pre-arranged lists in the database comprised in the storage device.

13. A method in accordance with claim 11, further comprising the steps of:
persistently storing a set of prepared emergency response plans for each such possible emergency condition; and
enabling through the secure emergency directive website the public users in the specific groups to navigate to group-specific displays of the prepared emergency response plans corresponding to the one such possible emergency condition.

14. A method in accordance with claim 11, further comprising the steps of:
providing supervisory control on a server location of an entity upon which the secure emergency directive website is deployed; and
communicating with the secure server.

15. A method in accordance with claim 11, further comprising the steps of:
for each such entity comprised in a plurality of entities, selecting one such pre-arranged list for one such possible emergency condition; and
dispatching the push notifications to the specific groups of public users in each such pre-arranged list.

16. A method in accordance with claim 11, further comprising the steps of:
for a higher entity with authority over other such entities, conditioning the dispatch of the push notification on approval input from the higher entity.

17. A method in accordance with claim 11, further comprising the steps of:
generating push notification messages comprising branding of an entity in WYSIWYG display format.

18. A method in accordance with claim 11, further comprising the steps of:
selecting from a list of geolocation areas where the possible emergency conditions can occur; and
listing a group of the public users with contact information associated with the selected geolocation area for receiving the push notification.

19. A method in accordance with claim 11, further comprising the steps of:
persistently storing a set of prepared emergency response plans for each such possible emergency condition; and
setting up the pre-arranged lists of the specific groups of public users based upon real-time artificial intelligence analysis by grouping the public users required to mobilize an effective emergency response to each such possible emergency condition for each of the emergency response plans and storing the grouping into the pre-arranged lists in the database comprised in the storage device.

20. A system, comprising:
a non-transitory computer-readable storage medium that stores computer instructions that, when executed by a processor on computer device, cause the processor to:
persistently storing pre-arranged lists of specific groups of public users and contact information for each such public user and a plurality of possible emergency conditions, each such possible emergency condition defining a push notification operative to mobilize an effective emergency response;
storing a plurality of landing web pages, each landing web page comprising group-specific displays of emergency directives tailored to one of the specific groups, each push notification comprising an electronically actuatable link to one such landing web page;

selecting using a secure server communicatively interfaced to a digital data communications network one such pre-arranged list of specific groups of public users upon an occurrence of one of the plurality of possible emergency conditions and dispatching the push notification corresponding to the one such possible emergency condition to the specific groups of public users in the selected pre-arranged list; and serving through a secure emergency directive web site one or more such landing web page in response to the electronically actuatable link as triggered over the digital data communications network by the specific groups of public users in the selected pre-arranged list and enabling the public users in the specific groups to navigate to the group-specific displays of emergency directives tailored to those specific groups.

* * * * *